United States Patent

Kirk

[15] 3,675,171

[45] July 4, 1972

[54] MAGNETICALLY OPERABLE DEVICE
[72] Inventor: Colin John Kirk, Crothorne, England
[73] Assignee: Martonair Limited, Twickenham, Middlesex, England
[22] Filed: Dec. 16, 1970
[21] Appl. No.: 98,649

[30] Foreign Application Priority Data

Jan. 15, 1970 Great Britain..........................2,013/70

[52] U.S. Cl..............................................335/232, 251/65
[51] Int. Cl..............................................................H01f 7/08
[58] Field of Search......................335/302, 306, 233; 251/65

[56] References Cited

UNITED STATES PATENTS 3,146,381  8/1964  Moreau..................................335/232
3,334,655  8/1967  Eppendahl............................251/65 X
3,495,620  2/1970  Raimondi et al....................251/65 X

*Primary Examiner*—George Harris
*Attorney*—Mawhinney & Mawhinney

[57] ABSTRACT

A magnetically operable valve or like device including a movable member and a fixed member, each including a magnetic material. The movable member is movable between positions remote from and adjacent the fixed member so that when the magnetic material of one of said members is magnetized and when said movable member is moved to a position adjacent the fixed member, a magnetic field is produced in the fixed member. The valve or like device also includes a movable magnetic element supported adjacent the side of the fixed member remote from the movable member and biased into an initial position from which it is movable by said magnetic field against the bias when the movable member is moved adjacent said fixed member.

9 Claims, 3 Drawing Figures

Patented July 4, 1972

3,675,171

INVENTOR
COLIN JOHN KIRK

MAGNETICALLY OPERABLE DEVICE

The invention relates to a magnetically operable device.

An object of the invention is to provide a magnetically operable device in which one movable member is employed to operate another movable member magnetically through a dividing wall and thus one movable member can be used to operate a valve member through a dividing wall in a housing of the valve or to operate another movable member through a wall of a container.

According to the invention, a magnetically operable device comprises a movable member and a fixed member, each of said members including a magnetic material, said movable member being supported to be movable between positions remote from and adjacent said fixed member so that when the magnetic material of one of said members is magnetized and when said movable member is moved to a position adjacent said fixed member, a magnetic field is produced in said fixed member, the device also comprising a movable magnetic element supported adjacent the side of the fixed member remote from said movable member and biased into an initial position from which it is movable by said magnetic field against the bias when said movable member is moved adjacent said fixed member.

The magnetic material of either of said movable or fixed members may be arranged to be magnetized but preferably the magnetic material of either said movable or said fixed member is magnetized permanently.

The magnetic material of said movable member may have a face formed with a groove defined between an outer periphery, which constitutes one pole when the magnetic material is magnetized, and an inner portion which constitutes the other pole, said face being arranged to be closely adjacent said fixed member when said movable member is moved into its adjacent position. The fixed member preferably comprises an outer portion of magnetic material complementary to said outer periphery, an inner core of magnetic material complementary to said inner portion, and a ring of non-magnetic material between said outer portion and core complementary to said groove. The said outer periphery may be annular and the inner portion may be cylindrical and coaxial with said outer periphery.

The fixed member is preferably supported by a wall of non-magnetic material.

Preferably said wall forms part of a valve device, said wall dividing said valve device into a pair of chambers, the movable member being arranged in one of said chambers and the movable magnetic element being arranged in the other of said chambers.

A magnetically operable device in accordance with the invention will now be described by way of example with reference to the accompanying drawings, in which.

Figure 1:
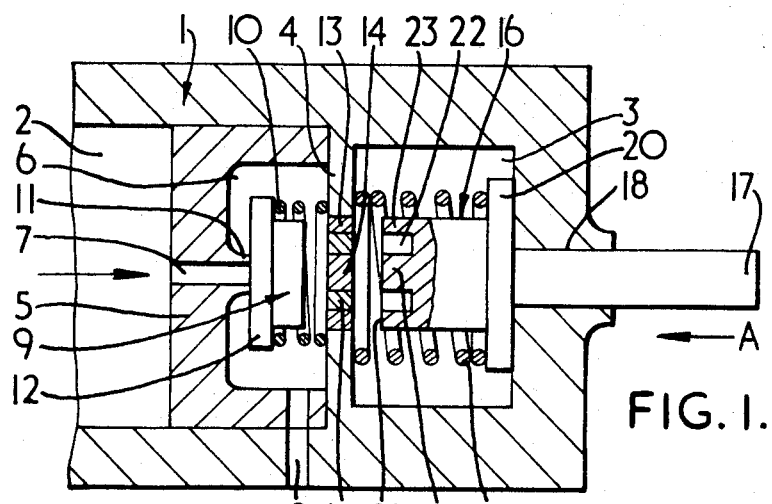
FIG. 1 is a longitudinal cross section of a magnetically operable valve.

With reference to FIG. 1 a magnetically operable valve comprises a non-magnetic body 1 divided into a pair of respective coaxial front and rear cylindrical chambers 2, 3 by a transverse non-magnetic wall 4. The front chamber 2 is provided with an insert 5 which defines a middle chamber 6 between itself and the wall 4. Communication between the front chamber 2 and middle chamber 6 is provided by a passage 7 formed in the insert 5 and communication between the middle chamber 6 and the outside of the body 1 is provided by another passage 8 formed in the side walls of insert 5 and front chamber 2. Communication between the passage and the front chamber 2 is normally prevented by a movable magnetic element 9 which is urged by a helical compression spring 10 into engagement with a seat 11 formed on the insert 5 to close passage 7. The helical compression spring 10 acts between a shoulder 12 on the element 9 and the wall 4.

The wall 4 is formed with an aperture provided with two magnetic inserts 13, 14 of which the outer insert 13 is in the form of an annular ring and of which the inner insert 14 is in the form of a cylindrical core. The two inserts 13, 14 are arranged coaxially with the front and rear cylinders 2, 3 and are spaced apart by a ring of non-magnetic material 15.

The rear chamber 3 houses a movable member 16, of magnetic material, which is of circular cross section and which is attached to a push rod 17 arranged for axial sliding in an aperture 18 formed in the valve body 1. The movable member 16 is urged into a position remote from the wall 4, as shown, by a helical compression spring 19 acting between the wall 4 and a flange 20 formed at the rear end of the movable member 16. The end of the movable member 16 which faces the wall 4, hereinafter referred to as the front end 21, is formed with an annular groove 22 which divides the front end 21 into an outer periphery 23 and an inner portion 24. The outer periphery 23, the groove 22 and the inner portion 24 are respectively complementary to the outer insert 13, the ring of non-magnetic material 15 and the inner core 14 of the wall 4.

The movable magnetic element 9 and the magnetic inserts 13, 14 may be formed from an alloy of iron, copper and nickel, hereinafter referred to as a soft magnetic material. Such material is easily magnetized but loses its magnetism when the magnetizing force is removed. In such a case the movable member may be a permanent magnet made of an alloy of iron, aluminum, nickel and colbalt hereinafter referred to as a hard magnetic material. Such material, when magnetized, retains its magnetizm when the magnetizing force is removed and is an ideal material for permanent magnets. The movable member could alternatively be made of a soft magnetic material and could be magnetized by using electrical means. Whichever material the movable member 16 is made from and when the material is magnetized, the outer periphery 23 constitutes one pole and the inner portion 24 constitutes the other pole.

The operation of the valve shown in FIG. 1 will now be described and for the purposes of description, the movable member 16 is assumed to be made from a hard magnetic material which is permanently magnetized.

With the movable member 16 in the position shown, the push rod 17 is urged forwardly in the direction of arrow A against the bias of spring 19 until the front end 21 of the movable member 16 engages, or is closely adjacent, the magnetic inserts 13, 14 in wall 4. The outer periphery 23 of the movable member 16 then magnetizes the annular magnetic insert 13 and the inner portion 24 simultaneously magnetizes the core insert 14, the inserts 13, 14 thereby having opposite polarity. This produces a magnetic field between inserts 13, 14 and the movable magnetic element 9 of sufficient strength to urge the element 9 off the seat 11 against the bias of spring 10. Communication through the passage 8, the middle chamber, the passage 7 and the front chamber 2 may then take place.

When the movable member 16 is permitted to move back to its starting position the soft magnetic materials of the element 9 and inserts 13, 14 lose their magnetism and the element 9 is urged into engagement with the seat 11 once more by the spring 10.

Although the inserts 13, 14 have been described as being made from a soft magnetic material, they could alternatively be made from a hard magnetic material which is permanently magnetized. Furthermore they may be made from a soft magnetic material and be magnetized by electrical means. In either case, and on each side of the wall 4, the annular insert 13 constitutes one pole and the adjacent face of the core insert 14 constitutes the other. The movable magnetic element 9 and the movable member 16 may then be made from a soft magnetic material and when the movable member 16, in a non-magnetized condition, is moved into engagement with or closely adjacent the inserts 13, 14, the magnetic field which exists between the element 9 and the inserts 13, 14 is so improved that the element 9 is urged off its seat 11.

The valve may be modified so that the element 9 is urged by a spring in the opposite direction, that is towards the wall 4, thus passage 7 is normally open. In such a case the element 9 could be made of a hard magnetic material which is permanently magnetized, the face of the element 9 adjacent the wall 4 being formed complementary to the inserts 13, 14 and of similar polarity thereto when the inserts 13, 14 are magnetized. The magnetic field produced between the element 9 and the inserts 13, 14, when the latter are magnetized, will then cause the element 9 to be repelled and urged against the spring to close passage 7.

Figure 2:
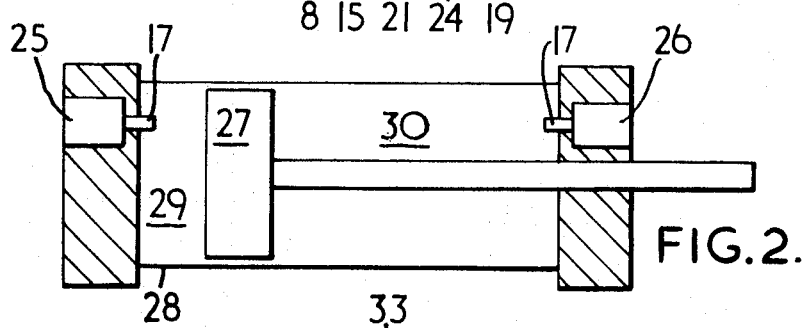
FIG. 2 is a schematic longitudinal cross section of a piston and cylinder device which incorporates a pair of magnetically operable valves of the type shown in FIG. 1.

In FIG. 2, two valves 25, 26 each of the kind shown in FIG. 1 are shown incorporated with a piston and cylinder device. The valves 25, 26 may be used to provide limits of travel for a piston 27. The piston 27 divides its associated cylinder 28 into respective front and rear compartments 29, 30 and the passage 8 of the valve 25 may be connected to the rear compartment 30 while the passage 8 of the valve 26 may be connected to the front compartment 29. The passage 7 of each valve communicates with the ambient air and is normally closed by the respective element 9.

In operation, pressure is applied to compartment 30 to urge the piston 27 towards the valve 25. When the piston 27 engages pushrod 17 of valve 25 and pushes it into the valve, the movable member 16 of valve 25 is urged into a position adjacent the inserts 13, 14 and the magnetic field produced lifts the element 9 off its seat 11. Pressure in compartment 30 is then released to the ambient air so that further movement of the piston 27 towards valve 25 will not occur. The method of operation of the piston 27 in the opposite direction is similar, pressure being applied to compartment 29.

Figure 3:
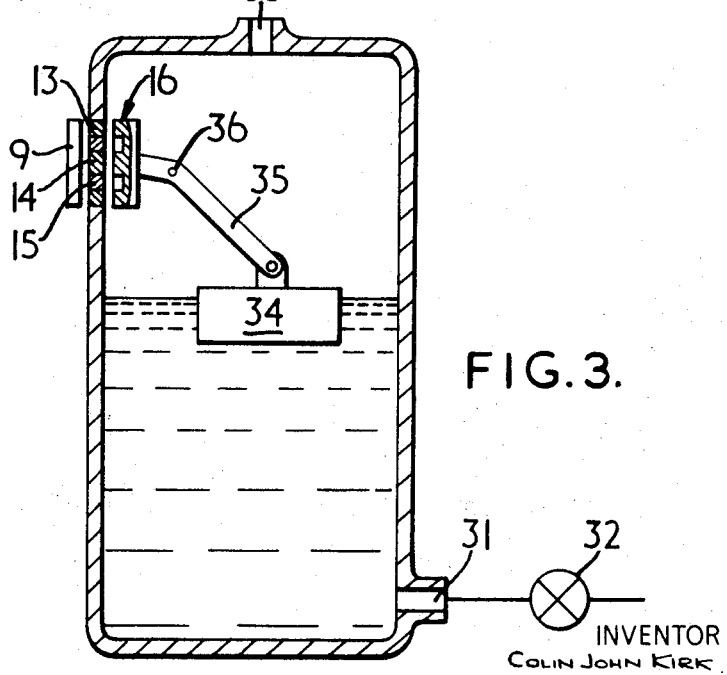
FIG. 3 shows another embodiment of a magnetically operable device fitted to a cistern.

FIG. 3 illustrates a cistern having a liquid outlet 31 at its lower end, controllable by a shut-off valve 32, and a gas inlet 33 at its upper end. A float 34 is arranged to rest on the surface of liquid in the cistern and is pivotally connected to one end of an arm 35 which is itself pivotally connected by a pin 36 to the wall of the cistern. The other end of the arm 35 is connected to a movable member equivalent to the movable member 16 shown in FIG. 1 and this, together with other parts corresponding to those shown in FIG. 1, will be denoted by corresponding reference numerals. The wall of the cistern, which is made from non-magnetic material, is formed with an aperture provided with a pair of inserts 13, 14 complementary to the movable member 16 and which are spaced apart by non-magnetic material 15. A movable magnetic element 9 is arranged adjacent the inserts 13, 14 and may be arranged to operate a control valve (not shown) for the gas inlet 33. The movable member 16 the inserts 13, 14 and the element 9 operate in the same manner as those described with reference to FIG. 1, rise and fall of the liquid level in the cistern controlling the movement of movable member 16.

What I claim as my invention and desire to secure by Letters Patent of the United States is:

1. A magnetically operable device comprising a movable member and a fixed member, each of said members including a magnetic material, said movable member being supported to be movable between positions remote from and adjacent said fixed member so that when the magnetic material of said movable member is magnetized and when said movable member is moved to a position adjacent said fixed member, a magnetic field is produced in said fixed member, the device also comprising a movable magnetic element supported adjacent the side of the fixed member remote from said movable member and biased into an initial position from which it is movable by said magnetic field against the bias when said movable member is moved adjacent said fixed member, the movable member having a face formed with a groove defined between an outer periphery, which constitutes one pole when the magnetic material of the movable member is magnetized, and an inner portion which constitutes the other pole when the magnetic material of the movable member is magnetized, said face being arranged to be closely adjacent said fixed member when said movable member is moved into its adjacent position.

2. A magnetically operable device as claimed in claim 1 in which the fixed member comprises an outer portion of magnetic material complementary to said outer periphery, an inner core of magnetic material complementary to said inner portion, and a ring of non-magnetic material between said outer portion and core complementary to said groove.

3. A magnetically operable device as claimed in claim 2 in which the said outer periphery is annular and the inner portion is cylindrical and co-axial with said outer periphery.

4. A magnetically operable device as claimed in claim 1 in which the magnetic material of the fixed member is permanently magnetized.

5. A magnetically operable device as claimed in claim 1 in which the fixed member is supported by a wall of non-magnetic material.

6. A magnetically operable device as claimed in claim 5 in which said movable member and said movable magnetic elements are biased in opposite directions against opposite sides of the wall by respective spring means.

7. A magnetically operable device as claimed in claim 6 in which the wall of non-magnetic material forms part of a valve device, the wall dividing the valve device into a pair of chambers, the movable member being positioned in one of the chambers and the movable magnetic element being arranged in the other of the chambers.

8. A magnetically operable device as claimed in claim 1 in which the movable magnetic element is magnetized permanently.

9. A magnetically operable device as claimed in claim 1 in which the magnetic material of said movable member is magnetized permanently.

* * * * *